Nov. 12, 1963  W. P. NAIL  3,110,532
INFLATABLE ARTICLES
Filed Oct. 26, 1960  2 Sheets-Sheet 1

INVENTOR.
WALTER P. NAIL
BY Douglas S. Johnson
ATTY.

Nov. 12, 1963     W. P. NAIL     3,110,532
INFLATABLE ARTICLES
Filed Oct. 26, 1960     2 Sheets-Sheet 2
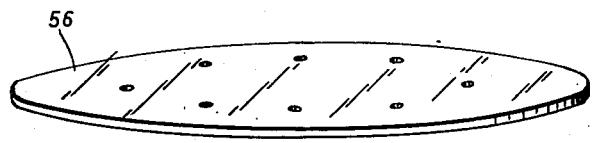
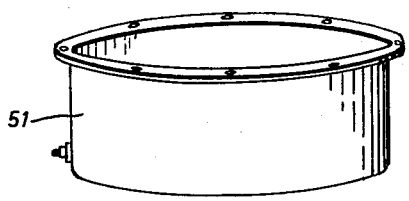
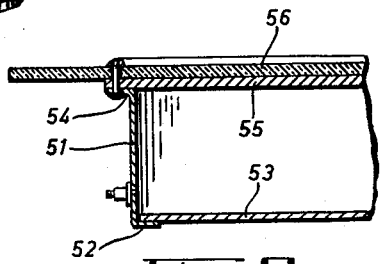
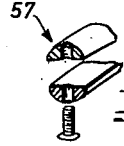
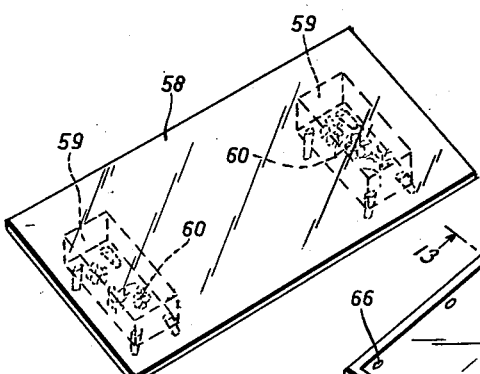
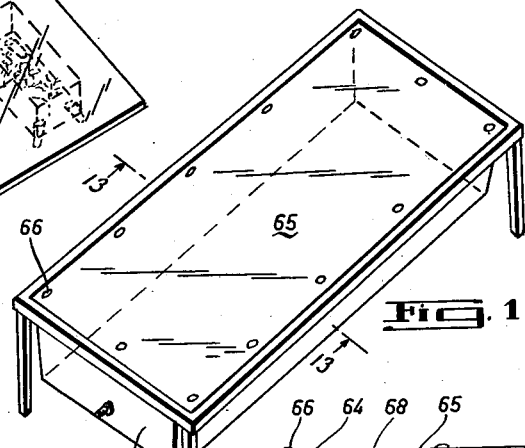
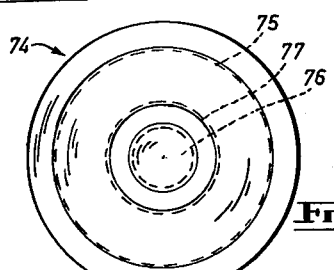
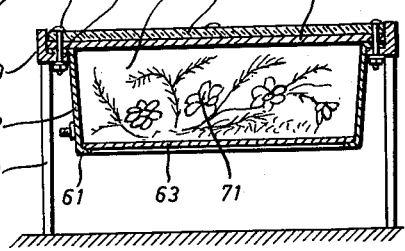
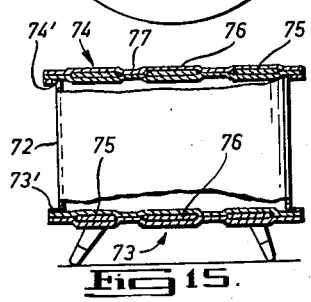
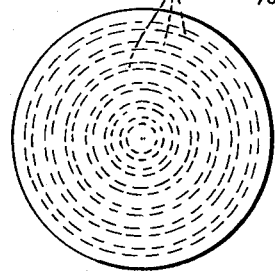
INVENTOR
WALTER P. NAIL
ATTY.

3,110,532
Patented Nov. 12, 1963

3,110,532
INFLATABLE ARTICLES
Walter P. Nail, 54 Osler Ave., Toronto, Ontario, Canada
Filed Oct. 26, 1960, Ser. No. 65,168
18 Claims. (Cl. 312—204)

This invention relates to inflatable articles of the type disclosed in my co-pending United States patent application Serial No. 674,480, now United States Patent 2,987,735.

According to the invention it has been found possible to produce inflatable articles having any desired cross-sectional configuration without requiring any packing, stuffing or other filler material and without requiring any internal frames, braces or the like by forming the inflatable article as a tube of flexible substantially non-extensible material and predetermining the inflated cross-sectional configuration of the tube by fixing the ends of the tube so that the perimetral configuration thereof corresponds to the desired inflated cross-section, the tube end walls embodying, incorporating or otherwise having associated therewith the means to conform the tube ends to such perimetral configuration.

Inflatable articles produced according to the invention, on inflation have completely adequate rigidity and resistance to deformation to be used, for instance, as hassocks, stools, chairs, chesterfields, coffee tables, serving tables or the like even through the supporting medium is merely air under pressure of but a few pounds per square inch so that the articles can readily be inflated by mouth.

Because air is the support medium and the inflatable article contains no internal frames or the like, according to the invention one or more walls of the article may be made transparent or translucent and the inflated chamber of the article may house any floral or other display disposed in the air chamber for unobstructed viewing.

It will be apparent that such display can be three-dimensional and it will be sealed within the chamber against dust, dirt, and against handling as for instance by children.

The invention will be more fully understood from the following detailed description taken in conjunction with the accompanying drawings, in which:

FIGURE 8 is a view similar to FIGURE 6 but showing a modified form of coffee table;

FIGURE 9 is a fragmentary mid-vertical sectional view of the coffee table of FIGURE 8;

FIGURE 10 is a fragmentary part-sectional, part-perspective view of the clamping means employed in the coffee table of FIGURES 8 and 9;

FIGURE 11 is a perspective view looking down from above on another form of coffee table embodying the invention;

FIGURE 12 is a perspective view of a further form of coffee table or similar furniture piece embodying the invention;

FIGURE 13 is a vertical sectional view on the line 13—13 of FIGURE 12;

FIGURE 14 is a plan view of still another hassock or stool embodying the invention;

FIGURE 15 is a mid-vertical sectional view through the article of FIGURE 14; and FIGURE 16 is still a further hassock or stool embodying the invention and shown in plan.

Figure 1:
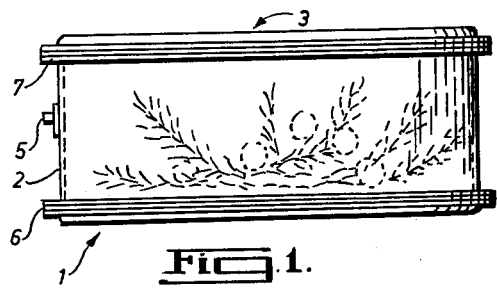
FIGURE 1 is a side elevational view of a hassock embodying the invention.

With reference to FIGURE 1, there is illustrated a hassock or stool which comprises a bottom wall 1, a side wall 2, and a top wall 3, defining a chamber 4 which is adapted to be inflated through the valve 5.

The side wall 2 is in the form of a tube of flexible collapsible substantially non-extensible material, preferably a heat sealable plastic, and the ends of this tube are permanently conformed to a fixed predetermined peripheral configuration corresponding to the desired cross-section of the article, in the case illustrated circular, by being sealed at 6 and 7, respectively, to the bottom wall 1 and top wall 3.

To conform the perimeter of the tube ends to the desired predetermined perimetral configuration, the lines of seal 6 and 7 are fixed by means of a rigid or substantially rigid control member 8 incorporated into each of the bottom and top walls. As illustrated, each of these bottom and top walls incorporates as the rigid member 8 a plate sandwiched between sheets 9, again preferably of heat sealable plastic, so that these sheets can be sealed together and to the ends of the tubular side wall 2 by the seals 6 and 7, which also effect the securement of the plates 8 between the sheets 9. These plates 8 not only define the fixed perimetral configuration of the ends of the tubes but also prevent the bottom and top walls from bulging out axially of the tube.

It has been found that by so fixing the perimetral configuration of the ends of the tubular side wall 2, the requisite shape and cross-section can be imparted to the hassock merely by inflating, as through the valve 5, to give with the rigid or substantially rigid end walls a solid substantial piece of furniture. The air pressure required is but a few pounds and the article of furniture can be readily inflated by mouth. Because the article can be supported as a substantially solid article by air without requiring any stuffing, the article can also form a display piece. To this end, in the hassock illustrated in FIGURES 1 and 2 the tubular side wall 2 is made of transparent plastic or at least a translucent plastic, and a display 10 is incorporated within the hassock so that it not only forms an attractive and useful piece of furniture, but also forms a display piece, the display being viewed through the viewing area as formed by the wall 2.

It will be understood that part of the wall 2 may be opaque if any particular desired viewing area only is required.

Figure 2:
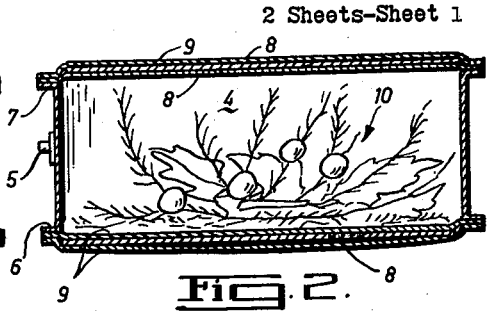
FIGURE 2 is a mid-vertical sectional view of the hassock of FIGURE 1.
Figure 3:
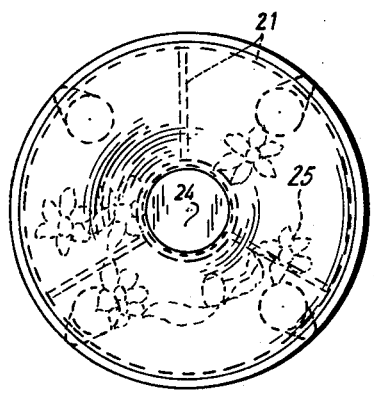
FIGURE 3 is a plan view of a modified form of hassock embodying the invention.
Figure 4:
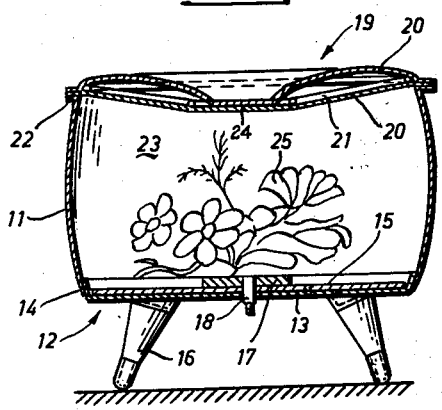
FIGURE 4 is a mid-vertical sectional view of the hassock of FIGURE 3.

With reference to FIGURES 3 and 4, the hassock illustrated comprises a tubular side wall 11 which again is of a heat sealable plastic, and is transparent in the preferred embodiment of the invention. The bottom wall generally designated at 12 comprises a flexible heat sealable plastic sheet 13 sealed to the lower end 14 of the tube 11 and a plate 15 which may comprise a rigid or substantially rigid heat sealable plastic sealed to the sheet 13, which plate imparts rigidity to the bottom wall as in the case of the plates 8 in FIGURE 2, to prevent outward bulging under inflation, and further, the plate 15 as in the plates 8 of FIGURE 2, predetermines the perimetral configuration of the lower end 14 of the tube so that its perimetral outline is fixed against distortion under inflation.

The plate 15 also serves as a support base for carrying legs 16 and there is provided through the base and the central support 17 an inflating valve 18.

The top wall 19 of the hassock is formed by a pair of flexible sheets 20 having sandwiched therebetween a wire frame 21, the sheets 20 being again preferably of a transparent heat sealable plastic and being sealed as at 22 to the upper end of the tube 11 to define an airtight chamber 23 and to seal the frame 21 between the sheets with the perimetral configuration of the frame fixing the perimetral configuration of the upper end of the tube along the requisite seal line 22.

The sheets of plastic material 20 are preferably also sealed together centrally of the hassock as at 24.

A display 25 is arranged within the chamber 23 and this display will be clearly visible through the transparent tubular side wall 11 and also through the transparent top wall as formed by the transparent sheets 20 and the frame 21.

Figure 5:
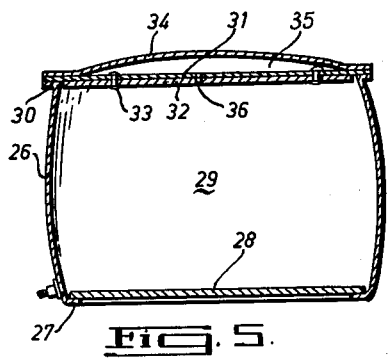
FIGURE 5 is a mid-vertical sectional view of a further modified form of hassock embodying the invention.

FIGURE 5 illustrates a hassock or stool wherein again the side wall 26 is of a tubular form and of a flexible plastic material corresponding to the side walls 2 and 11 of the article shown in FIGURES 1 and 4. In this case the lower end 27 of the tube is sealed directly to a heat sealable rigid or substantially rigid plastic plate 28, the plate serving to resist endwise or outward bulging of the hassock under inflation of the chamber 29 and, also, through its rigid periphery determining the fixed perimetral configuration of the lower tube end 27.

The upper end of the tube is sealed as at 30 to heat sealable plastic sheets 31, to which at least a measure of rigidity is imparted by reinforcing the plate 32 secured thereto by rivets 33.

Overlying the sheet 31 is a further sheet of plastic material 34 sealed to the sheet 31 and to the upper end of the tubular side wall 26 by the seal 30 above-described. The sheet 34 provides the chamber 35 for receiving air which may bleed through the sheet 31 around the rivets 33 or additional bleed passage 36. Further, the chamber 35 may also contain suitable cushioning material to give a cushioning effect. Any or all of the surfaces may be transparent or at least translucent and the plate 32, for instance, may comprise a glass plate.

Figure 6:
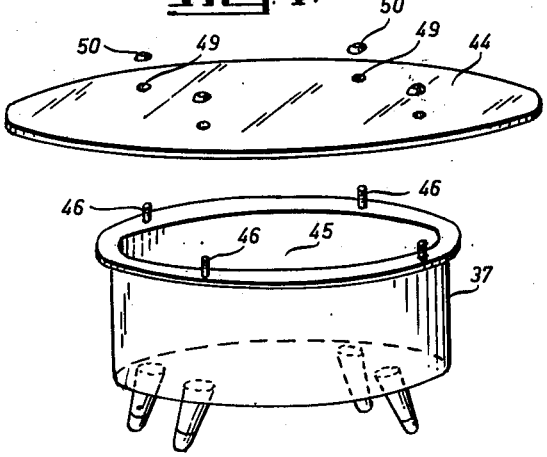
FIGURE 6 is an exploded perspective view illustrating a coffee table embodying the invention.
Figure 7:
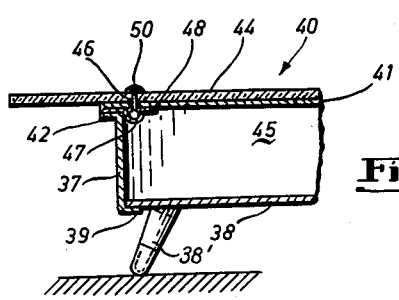
FIGURE 7 is a fragmentary mid-vertical perspective view of the coffee table of FIGURE 6.

With reference to FIGURES 6 and 7, there is shown a coffee table which comprises a tubular side wall 37 of flexible heat sealable plastic corresponding to the side wall 2 of FIGURE 1, a rigid bottom wall 38 of heat sealable plastic having integrally molded legs 38' to which the lower end 39 of the tube 37 is sealed, and a top wall formation generally designated at 40.

This top wall formation comprises a sheet 41 of plastic heat sealed as at 42 around the periphery of the upper edge of the tubular side wall 37, and an overlying glass plate 44. The sheet 41 may be of a flexible plastic with the glass plate 44 giving the rigidity against upward bulging under inflation to the chamber 45, and further, defining the means of fixing the perimeter of the upper edge or end 42 of the tube to conform to a fixed predetermined perimetral configuration. In order to enable the glass plate 44 to perform these functions, as shown particularly in FIGURE 7, a series of fastening elements 46 are fixed at the underside of the sheet 41 by means of a circular strip 47 of heat sealable plastic having one side sealed in the seal 42 and having the other side sealed as at 48 so that these fasteners are sealed off from the chamber 45. These fasteners are arranged to project up through openings 49 in the glass plate 44 to receive clamping nuts 50 to effect the assembly of the glass plate 44 to the top of the hassock.

The sheet 41 may be transparent, as may the side wall 37, to provide the desired viewing areas for any display (not shown) which may be placed within the table.

FIGURES 8 and 9 show another coffee table or the like having a side wall 51 corresponding to the side wall 2 of FIGURE 1, secured at its lower end as at 52 to a rigid heat sealable plastic plate 53.

The upper end of the side wall 51 is sealed as at 54 to a relatively thicker heat sealable plastic plate 55 which may be transparent or translucent as desired, and clamped to the perimeter of the plastic plate 55 is a glass plate 56, secured as by the clamping assembly generally designated in FIGURE 10 at 57.

FIGURE 11 illustrates how a coffee table or the like may be formed of a large glass plate 58 supported at spaced points by inflatable chambers 59, which utilizing the glass plate 58 after the manner of the glass plates 44 and 56 of FIGURES 6 and 8, respectively, may be formed in accordance with the construction shown, for example, in FIGURES 7 and 9.

Each of the chambers 59 may comprise a suitable display 60 to be viewed through the glass plate 58.

FIGURES 12 and 13 show a further form of coffee table which also forms a display piece. These figures further illustrate the fact that the shape of the article can in cross-section be any shape desired, even though inflated, by the application of the invention. Thus, the lower end 61 of the tubular side wall 62 of the table is constrained to a rectangular perimetral configuration by a bottom plate 63 of rectangular form, to which the flexible heat sealable plastic material of the side wall 62 is fixed.

The upper end 64 of the side wall tube 62 is also constrained to conform to a rectilinear configuration by being fixed to a rigid glass top 65, being clamped thereto by clamping bolts 66.

A plastic sheet 67 is sealed around the perimeter of the upper end 64 of the tubular side wall 60 to provide an inflatable chamber 68, and its perimetral configuration, like the upper end of the tube 62, is fixed by the clamping bolts 66.

The clamping bolts 66 also serve to clamp the assembly to rectangular frame 69 carrying support legs 70.

The side wall tube 62 may, if desired, be transparent and both the plastic sheet 67 and the glass plate 65 will, of course, be transparent so that a suitable display 71 contained within the inflatable chamber 68 can be viewed from above.

Turning to FIGURES 14 and 15, the hassock illustrated again comprises a tubular side wall 72 corresponding to the side wall 2 of FIGURE 1, and in place of the solid plates 8 sandwiched between the flexible sheets 9 in the end walls of FIGURES 1 and 2, there is provided in each of the bottom and top walls 73 and 74 a rigid annular disc 75 and a concentrically arranged disc 76. The discs 75 impart to the points of connection 73' and 74' between the side wall 72 and the bottom and top walls 73 and 74, respectively, a fixed predetermined perimetral configuration. However, the bottom and top walls 73 and 74 are not completely rigid as the central portions thereof formed by the discs 76 are free to move axially with respect to the surrounding discs 75, the plastic sheets forming the end walls and sandwiching the discs being sealed around the discs 76, as at 77. The result provided is a spring action so that when weight is placed centrally of the top, the disc 76 at the top will move downwardly, accompanied by a corresponding downward movement of the disc 76 at the bottom. Upon removal of the weight, however, the central portions of both bottom and top walls will return to the original position shown in FIGURE 15. Thus, the hassock will comfortably adjust to the contours of the weight applied with a somewhat spring-like action.

In the hassock shown in plan in FIGURE 16, instead of merely using a cylindrical disc 75 and a concentric disc 76, a series of rings 78 may be utilized to produce the same effect as the discs.

It will be understood that the embodiments of the invention herein illustrated are by way of example only and inflatable articles embodying the invention may take many other different forms within the scope of the appended claims.

What I claim as my invention is:

1. An inflatable article comprising a tube of flexible collapsible substantially non-extensible material having its ends sealed throughout the length of the perimeter thereof to chamber defining end wall formations, the arrangement being such that the said tube end perimeters are permanently conformed to a fixed predetermined perimetral configuration corresponding to the desired cross-section of the article and said tube extends free of any rigid support between said end wall formations, said end wall formations being resistant to deformation axially of said tube, valve means for inflating the chamber defined by said tube and end wall formations whereupon the tube assumes the cross-section determined by said fixed perimetral configuration, at least a portion of one of said tube and end wall formations being at least translucent to form a viewing area into said chamber, and a display arranged within said chamber to be viewed through said viewing area.

2. An inflatable article as claimed in claim 1 in which said tube is of a transparent material.

3. An inflatable article as claimed in claim 1 in which one of said end wall formations is of a transparent material.

4. An inflatable article as claimed in claim 1 in which one of said end walls comprises a transparent plastic material and an overlying glass plate.

5. An inflatable article as claimed in claim 1 in which said tube and one of said wall formations are transparent.

6. An inflatable article as claimed in claim 1 in which said tube is of a plastic material and at least one of said end walls comprises a plastic sheet to which the respective tube end is sealed throughout its perimeter and a stiffening member imparting at least a rigid perimetral configuration substantially along the line of seal between said plastic sheet and said latter tube end.

7. An inflatable article as claimed in claim 6 in which said stiffening member comprises a rigid frame member.

8. An inflatable article as claimed in claim 6 in which said stiffening member comprises a rigid plate overlying said plastic sheet and fixed to said sheet by a second plastic sheet overlying said rigid plate and sealed to said first-mentioned plastic sheet around the perimeter of said plate.

9. An inflatable article as claimed in claim 6 in which said plastic sheet is transparent and said stiffening member comprises a glass plate overlying and secured to said plastic sheet.

10. An inflatable article as claimed in claim 9 in which said plastic sheet is secured to said glass plate substantially along the line of seal between said plastic sheet and the tube end sealed thereto.

11. An inflatable article as claimed in claim 8 in which said rigid plate is in the form of a closed frame and a second rigid plate is secured between the said first and second-mentioned plastic sheets within said closed frame.

12. An inflatable article comprising two overlying wall portions each having at least a rigid perimetral portion and each being substantially resistant to deformation throughout its area, and a flexible collapsible, substantially non-extensible side wall formation connecting the perimetral portions of said overlying wall portions to define an inflatable chamber therewith and being free of support between said overlying wall portions, said overlying wall portions being adapted on inflation to move to a position of maximum separation with said side wall formation being stretched therebetween substantially solely in tension, the side wall formation assuming a configuration in accordance with the configuration of the rigid perimetral portions between which it is stretched and under which side wall formation under the application of pressure externally to the overlying wall portions resists collapse, at least a portion of one of said side and overlying wall portions being at least translucent to form a viewing area into said chamber, and a display arranged within said chamber to be viewed through said viewing area.

13. An inflatable article comprising a bottom wall defining a rigid perimeter corresponding to the desired cross-sectional configuration of the article above said bottom wall, a tubular side wall formed of a flexible collapsible substantially non-extensible plastic material having one end fixed to said bottom wall around the perimeter thereof and a top wall defining with said bottom and side walls an inflatable chamber, said top wall comprising a plastic sheet sealed to the other end of said side walls, and means fixing the line of seal between said plastic sheet and latter tube end to conform to a fixed predetermined perimetral configuration corresponding to the desired cross-sectional configuration of the article below said top wall, said tube being free of support between said bottom wall and said top wall, at least one of said top and side walls being substantially transparent.

14. An inflatable article as claimed in claim 13 in which said means fixing the line of seal between said plastic sheet and respective tube end comprises a rigid plate and means clamping said plastic sheet to said plate to follow said predetermined perimetral configuration.

15. An inflatable article as claimed in claim 14 in which said plastic sheet is transparent, and said rigid plate comprises a glass plate.

16. An inflatable article as claimed in claim 13 having leg members carried by said bottom wall.

17. An inflatable article comprising a bottom wall defining a rigid perimeter corresponding to the desired cross-sectional configuration of the article above said bottom wall, a tubular side wall formed of a flexible collapsible substantially non-extensible plastic material having one end fixed to said bottom wall around the perimeter thereof and a top wall defining with said bottom and side walls an inflatable chamber, said top wall comprising a plastic sheet sealed to the other end of said side wall, and means fixing the line of seal between said plastic sheet and latter tube end to conform to a fixed predetermined perimetral configuration corresponding to the desired cross-sectional configuration of the article below said top wall, said means fixing the line of seal between said plastic sheet and respective tube end comprising a rigid plate and means clamping said plastic sheet to said plate to follow said predetermined perimetral configuration.

18. An inflatable article as claimed in claim 17 in which said plastic sheet is transparent and said rigid plate comprises a glass plate.

References Cited in the file of this patent

UNITED STATES PATENTS

| | | |
|---|---|---|
| 588,288 | Petett | Aug. 17, 1897 |
| 1,471,886 | Dessau | Oct. 23, 1923 |
| 1,565,827 | Sweeney | Dec. 15, 1925 |
| 1,680,963 | White | Aug. 14, 1928 |
| 1,965,349 | Luttbeg | July 3, 1934 |
| 2,510,124 | McKinney | June 6, 1950 |
| 2,696,870 | Mende | Dec. 14, 1954 |
| 2,987,735 | Nail | June 13, 1961 |